3,480,478
ADHESION BETWEEN LEAD ELECTRODES AND PARTICLES EMBEDDED THEREIN AND METHOD OF MAKING SAME
August Wilhelm Sohn, Mannheim-Waldhof, and Albert Erasmus, Mannheim-Kafertal, Germany, assignors to Zellstoffabrik Waldhof A.G., Mannheim-Waldhof, Germany, a corporation of Germany
No Drawing. Filed Feb. 6, 1967, Ser. No. 613,998
Claims priority, application Germany, Feb. 12, 1966, Z 12,025
Int. Cl. H01m 39/00; B32b 15/04
U.S. Cl. 136—26      8 Claims

ABSTRACT OF THE DISCLOSURE

Light weight lead electrodes having embedded therein particles coated with a ligninsulfonate, which ligninsulfonate has been tempered in powder form at temperatures above 100° C.

PRIOR ART

In galvanic cells, especially in electric lead accumulators, electrodes having small tubelets embedded in the active mass have been outstanding. Repeated attempts have been made to reduce the weight of the active mass of the electrode by various means, such as embedding in the active mass synthetic plastic particles in the form of small grains, strings or fibers. However, it was discovered that the adhesive bonding between the active lead mass and the particles was not always sufficient, with a resulting weakening of the electrodes. Uncoated fibers in lead electrodes caused an accumulation of ions which reduced the conductivity and usefulness of the electrodes.

OBJECTS OF THE INVENTION

It is an object of the invention to provide an improved lighter weight lead electrode containing particles embedded therein.

It is another object of the invention to provide a novel method of reducing internal cell resistance of lead electrodes by embedding therein particles by coating the particles with a tempered ligninsulfonate.

These and other objects and advantages of the invention will become obvious from the following detailed description.

THE INVENTION

The improved electrodes of the invention are comprised of lead electrodes having embedded in the active mass thereof particles which have been coated with a ligninsulfonate which has been condensed by heating in powdered form at temperatures above 100° C., preferably between 150° and 220° C., which increases the adhesion between the said particles and the lead mass.

Examples of suitable particles which are to be embedded in the active mass are thermoplastic resins, duroplastic resins, glass, asbestos, other mineral substances, etc., in the form of small grains, filaments or strings and fibers. The electrodes preferably contain 10 to 30% by weight of the lead of the coated particles.

Examples of suitable condensed ligninsulfonates used to coat the particles are those prepared from ligninsulfonic acid and ammonium, alkali metal, alkaline earth metal and lead salts thereof. The condensation of the said ligninsulfonate compounds has to be effected in the pulverized form by heating at temperatures above 100° C. under constant agitation. During the heating, water and sulfur dioxide split off and a partial condensation is simultaneously effected. The ligninsulfonates are preferably applied to the particles to be coated as an aqueous solution or suspension and are applied in amounts from 6 to 20%, preferably 10 to 15%, based on the weight of the particles.

Ligninsulfonates from spent sulfite liquors have been added as such to the active mass of lead accumulators. Also, the undesired components of spent sulfite liquors have been heated to elevated temperatures of 270° to 300° C. during which an expanded structure is formed which is then pulverized and added to the active mass of lead accumulators containing ligninsulfonates from spent sulfite liquors. However, the undesired constituents are after this treatment only inorganic salts and/or ash which act as a filler only and do not affect the adhesive bond between the lead mass and the ligninsulfonates.

In contrast thereto, the ligninsulfonates are not destroyed by the heat treatment but retain their wetting agent characteristics and are especially useful in establishing a very effective adhesive bond between the lead and the particles embedded therein. The tempered ligninsulfonates are particularly useful since they are practically insoluble in the acid used in storage batteries and, therefore, the lead plates possess an excellent stability even under elevated temperatures.

The lead electrodes of the invention result in a considerable saving in the amount of lead required for the electrodes and a considerable reduction in the weight of the electrode. In addition, cells containing the electrodes have a longer active lifetime and improved initial output and voltage rating.

In the following examples there are described several preferred embodiments to illustrate the invention. However, it should be understood that the invention is not intended to be limited to the specific embodiments.

EXAMPLE I 100 gm. of powdered sodium ligninsulfonate were heated at a temperature of 200° C. for one hour. At this temperature and this duration of heating, the said sodium ligninsulfonate remained barely water-soluble. Then, 300 gm. of polyvinyl chloride shavings were saturated with a 25% aqueous solution of the said tempered sodium ligninsulfonate. After draining off the excess solution and drying the shavings, the shavings weighed 351 gm. which was a weight increase of 17%. The treated shavings were then placed for four days in battery acid $$(D=1:285)$$

at a temperature of 75° C. Then, the shavings were carefully rinsed with distilled water, dried and weighed. The said shavings still had 33% of the tempered sodium ligninsulfonate adhering thereto after this treatment.

EXAMPLE II 100 gm. of powdered magnesium ligninsulfonate were heated at a temperature of 210° C. for one and a half hours. A 125 gm. of a 25% solution of the thus treated magnesium ligninsulfonate were added to 400 gm. of polyvinyl chloride shavings. After the excess solution was drained off and dried as in Example I, the shavings were placed for four days in battery acid at a temperature of 75° C. After this treatment, the shavings were carefully rinsed with distilled water and dried. 29% of the magnesium ligninsulfonate applied to the shavings still adhered thereto.

EXAMPLE III

The shavings of polyvinyl chloride coated in Example I with the tempered sodium ligninsulfonate were dispersed in active lead at a weight ratio of 0.5% of shavings based on the active lead. With this lead substance, the usual electrodes were produced with the following dimensions: 124 mm. long, 143 mm. wide and 2 mm. thick.

Due to the light weight of the coated polyvinyl chloride shavings and due to their great volume, about 20% by weight of lead was saved in the production of these electrodes. In other words, whereas an electrode of the said measurements with a customary lead substance weighed from 110 gm. to 114 gm. (without lead screen) depending upon the specific type of lead oxide used, the weight of the plate with the additive of the invention weighed only 90 gm. In addition to the considerable savings of the more expensive lead substances, the electrode of the invention showed an improvement in the initial output, in the voltage rating and in the charge maintenance of pre-charged batteries as compared to the prior art electrode. Moreover, an increase of the cold start power and a higher starting potential at the beginning of the charge were observed as well as up to a ⅓ reduction of the self-discharge compared with the known construction occurred accompanied with a decrease in the screen corrosion of the positive electrode and a lessening of the danger for the negative electrode to become lead covered.

Furthermore, a reduction in natural elutriation of the positive electrode and, subsequently, an increase in the durability of the battery was attained. As a further advantage, a significant charge capacity (storage capacity) up to the occurrence of the gas pressure was obtained. These numerous advantages could not be anticipated in comparison with a standard plate. Also, these advantages were obtained when compared with the plate containing fibers or shavings of synthetic material embedded therein which were not covered with a tempered salt of ligninsulfo acid. The fibers, pre-treated according to the invention, had a low internal cell resistance so that reduction in voltage up to the permissible limit of termination of discharge was temporarily delayed and the excellent properties as described above were achieved.

Various modifications of the electrode and process of the invention may be made without departing from the spirit or scope thereof and it is to be understood that the invention is to be limited only as defined in the appended claims.

We claim:

1. A method of improving adhesion between the active lead of a lead electrode containing 10 to 30% by weight of particles embedded therein which comprises
   (a) coating the particles with at least one ligninsulfonate selected from the group consisting of ligninsulfonic acid and its ammonium, alkali metal, alkaline earth metal and lead salts, the said ligninsulfonate being present in the range of 6 to 20% by weight based on the particle weight, and said ligninsulfonate having been previously heated in powder form at temperatures between 100° and 220° C.,
   (b) dispersing the coated particles in active lead and forming a lead electrode from the said active lead.

2. The method of claim 1 wherein the ligninsulfonate was heated at a temperature between 150 to 220° C.

3. The method of claim 1 wherein the ligninsulfonate is applied in amounts between 10 to 15% by weight of the particles.

4. The method of claim 1 wherein the ligninsulfonate is applied to the particles as an aqueous solution.

5. The method of claim 1 wherein the particles consist of a material selected from the group consisting of a thermoplastic resin, duroplastic resin, glass and asbestos.

6. The method of claim 1 wherein the particles are polyvinyl chloride shavings.

7. A lead electrode comprised of active lead containing 10 to 30% by weight of particles embedded therein, the said particles having been coated with 6 to 20% by weight of the particles of at least one ligninsulfonate selected from the group consisting of ligninsulfonic acid and its ammonium, alkali metal, alkaline earth metal and lead salts which ligninsulfonates have been heated prior to embedding in powder form at temperatures between 100 to 220° C.

8. The electrode of claim 7 wherein the particles are coated with 10 to 15% by weight of the ligninsulfonate.

References Cited
UNITED STATES PATENTS

| | | | |
|---|---|---|---|
| 1,467,321 | 9/1923 | Hurt | 106—38.2 |
| 2,022,482 | 11/1935 | Stewart | 136—26.6 |
| 2,161,749 | 6/1939 | Samaras et al. | 136—26.7 |
| 2,241,627 | 5/1941 | Birt et al. | 136—26.6 |
| 2,242,601 | 5/1941 | Wallace | 136—26.7 |
| 2,371,137 | 3/1945 | Orsino et al. | 136—26.6 |
| 2,677,713 | 5/1954 | Neil et al. | 136—26 |
| 3,318,794 | 5/1967 | Kiyohara et al. | 136—27 |
| 3,330,674 | 7/1967 | Santmyer | 106—38.5 |

WINSTON A. DOUGLAS, Primary Examiner

C. F. LEFEVOUR, Assistant Examiner

U.S. Cl. X.R.

117—100